(12) United States Patent
Viaud et al.

(10) Patent No.: US 7,166,808 B2
(45) Date of Patent: Jan. 23, 2007

(54) APPARATUS FOR MEASURING THE WEIGHT FORCE OF A LOAD PROCESSED BY A MACHINE

(75) Inventors: Jean Viaud, Gray (FR); Stephane Biziorek, Champlitte (FR)

(73) Assignee: Deere & Company, Moline, IL (US)

( * ) Notice: Subject to any disclaimer, the term of this patent is extended or adjusted under 35 U.S.C. 154(b) by 301 days.

(21) Appl. No.: 10/826,608

(22) Filed: Apr. 16, 2004

(65) Prior Publication Data

US 2004/0250703 A1    Dec. 16, 2004

(30) Foreign Application Priority Data

May 17, 2003  (DE)  .............................. 103 22 336

(51) Int. Cl.
*G01G 19/08*  (2006.01)
(52) U.S. Cl. ............................. 177/1; 177/50; 177/136; 53/502; 56/432; 56/474
(58) Field of Classification Search .................... 177/1, 177/50, 136–139; 53/502; 56/432, 474
See application file for complete search history.

(56) References Cited

U.S. PATENT DOCUMENTS 3,669,756 A * 6/1972 Bradley ..................... 177/136
3,990,032 A * 11/1976 Fish et al. ..................... 338/5
4,362,097 A * 12/1982 Rogers ......................... 100/99
4,909,338 A * 3/1990 Vitunic et al. ................ 177/50
5,143,164 A * 9/1992 Nahar .......................... 177/50
5,167,287 A * 12/1992 Pomies ......................... 177/1
D337,410 S * 7/1993 Jones ........................ D34/28
5,230,393 A * 7/1993 Mezey ...................... 177/139
5,509,293 A * 4/1996 Karumanchi ............... 73/1.13
5,750,938 A * 5/1998 De Caris et al. ............. 177/50
6,378,276 B1 * 4/2002 Dorge et al. .................. 53/502

FOREIGN PATENT DOCUMENTS

FR           2651880        *    3/1991

* cited by examiner

*Primary Examiner*—Randy W. Gibson

(57) ABSTRACT

An apparatus is provided for measuring the weight force of a bale in a baler wherein the bale moves between a first position, within the baling chamber, and a second position, within a wrapping apparatus carried by the baler chassis. A measurement device, which is connected to a data processing device, is provided, for measuring a measurement parameter influenced by the weight force of said bale in each of said first and second positions and developing a signal representative of the weight of the bale at those positions. The processing device is set up to calculate the weight force of the bale taking into account a first signal output from the measurement device when the bale is in the first position and a second signal output from the measurement device when the bale is in the second position.

6 Claims, 2 Drawing Sheets

APPARATUS FOR MEASURING THE WEIGHT FORCE OF A LOAD PROCESSED BY A MACHINE

FIELD OF THE INVENTION

The invention relates to an apparatus for measurement of the weight force of a load in a machine set up to form and/or process loads, wherewith the load is movable in the machine between a first position and a second position, and a measurement device for measuring a measurement parameter influenced by the weight force of said load is provided.

BACKGROUND OF THE INVENTION

In the state of the art, a number of devices for measuring the mass of a bale comprised of pressed agricultural crop material are known. E.g., it has been proposed (DE 44 36 128A, DE 198 163A, U.S. Pat. Nos. 4,4,742,880 A, 5,384, 436 and 5,742,010 A) to convey a fabricated bale out from the press chamber and onto a support surface, where the weight force of the bale is measured while the bale is at rest or is moving, the measurement being a measurement of the force exerted on the support surface. Because a bale has a relatively high mass, bringng it to a complete stop requires substantial effort. However, if one attempts to measure the weight force while the bale is moving, the process is subject to substantial measurement error.

In DE 195 43 343 A, it was proposed to measure the weight forces acting on the axles and the tow-bar of a baling press. The weight force of the fabricated bale is calculated based on the change in the forces when a bale is ejected. In order to obtain usable measurement values with this approach, a large number of sensors and a highly developed calculation scheme are required.

SUMMARY OF THE INVENTION

The underlying problem of the present invention is expressed as to devise a simple and reliable apparatus for measurement of the weight force of a bale, which apparatus does not have the abovementioned drawbacks or has them only to a lesser degree.

This problem is solved according to the invention by providing a machine for forming and/or processing of a load, which is movable in the machine between a first and a second position. It is proposed to employ a measurement device in such a way that it measures a parameter, which is dependent on the weight force of the load when the load is in the aforesaid first position, and provides a first signal. Then the load will be moved into the second position. The measurement device, which may be the same measurement device, will again measure a parameter which is dependent on the weight force of the load, and will provide an associated second signal. A processing device receives the first and second signals, and making use of both signals the processing device calculates the weight force of the load.

In this way an apparatus is provided for measurement of the weight force of a load, which apparatus is particularly suitable for machines in which the load is moved between different positions. The effect of the position of the load on the value of the parameter measured by the measurement device is ascertained and is employed for calculating the weight force of the load.

The output of the processing device for calculating the weight force of the load is based on the signals of the measurement device and on known mechanical properties of the machine, such as, e.g., the respective distances of the first and second positions of the load from a center of gravity or swing point of the machine, and other mechanical data concerning the machine. Also, the processing device receives information about the current position of the load. The calculation processes carried out in the processing device can be based on physical models of the machine. Alternatively or additionally, measurements of parameters obtained from actual loads may be employed, which can be stored in a data bank or in the form of calibration curves. Such measurements may also be employed as machine-specific quantities in calculation methods based on physical models of the machine.

The measurement device may be disposed between the frame or rigid housing of the machine and the wheels which support the frame or housing. In such a location, the measurement device measures the force of the frame or housing on the wheels, which force is influenced by the subject load. When a tandem axle is employed, the measurement device may measure a corresponding rotational moment. The measurement device may alternatively, or additionally be disposed between the frame or housing and a coupling eye, in which case it measures the force which the machine exerts on a towing machine, or the force by which the coupling is urged upward.

Because of the inventive evaluation of the signal of the measurement device with the load in the various positions, only a single measurement device is needed. However, one might consider using a plurality of measurement devices of the described type, which could be disposed at different locations. This would provide redundancy in the event of a malfunction of one measurement device, and in general would enable improved accuracy of the measured parameters.

A machine for producing and processing loads wherein the inventive apparatus might advantageously be used is, e.g., a combination bale press and bale wrapper. The first position of the load (here the bale) corresponds to the press chamber wherein the bale is fabricated from agricultural crop material or any other material, e.g. wastes, and the second position is the wrapping position. The invention can also be applied to any other machine in which a load is moved, e.g., it may be applied to machines which pick up agricultural crop material and charge it to a container, which container, as soon as it is filled, is moved to another station, at which it is wrapped with a film or is otherwise packaged.

BRIEF DESCRIPTION OF THE DRAWINGS

The drawings illustrate an exemplary embodiment of the invention, which will be described in more detail herein below.

DESCRIPTION OF THE PREFERRED EMBODIMENT

Figure 1:
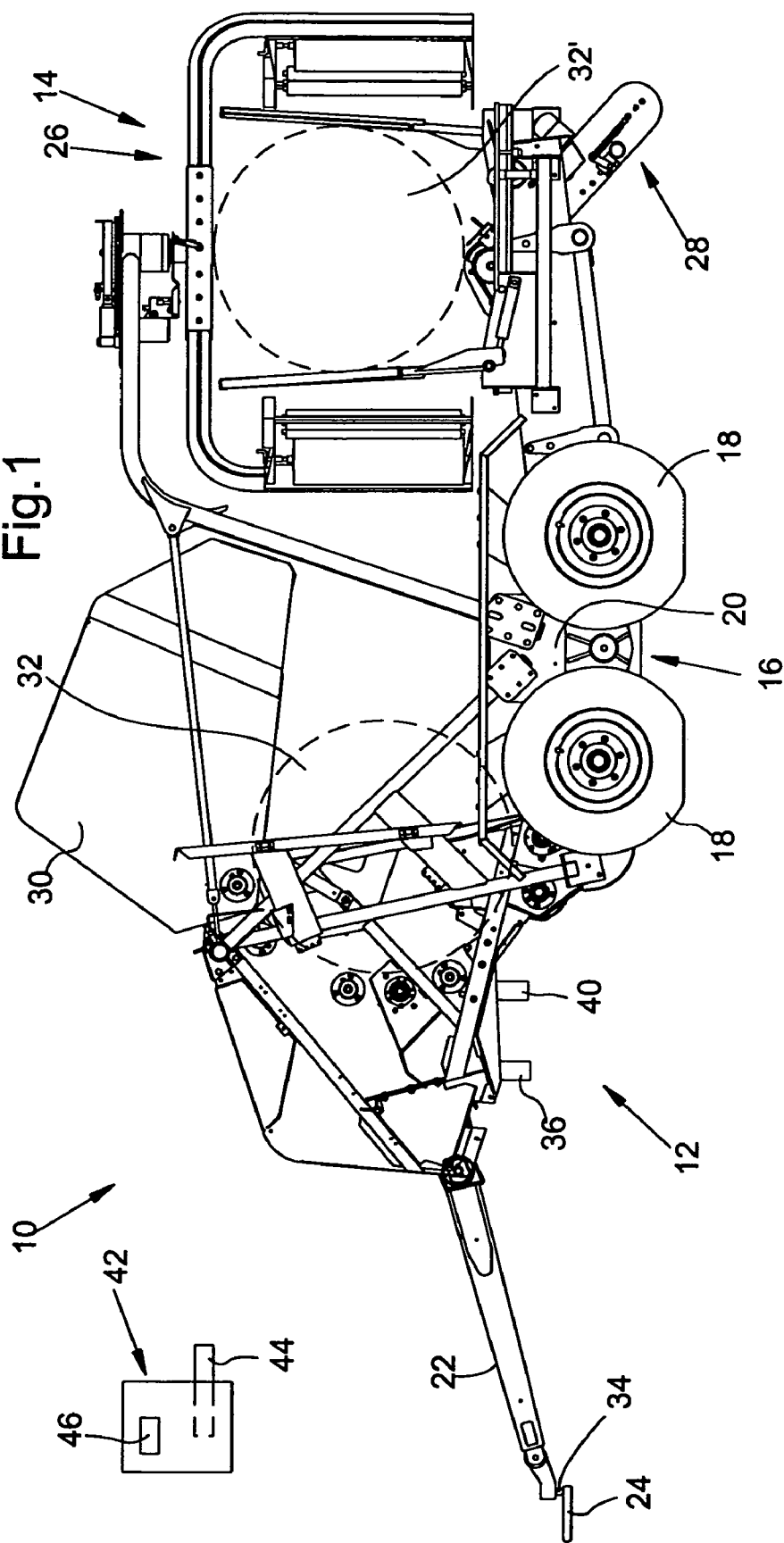
FIG. 1 is left side view of a machine for forming and wrapping a bale of agricultural crop material, which machine is in the form of a combination of a press, a wrapping apparatus, and an undercarriage.

The machine 10 for the producing and wrapping of bales of agricultural crop material is essentially comprised of a press 12, a wrapping apparatus 14, and an undercarriage 16. The machine 10 may be referred to as a "combination press and wrapping machine".

The undercarriage 16 has a tandem axle with two wheels 18, 18 mounted to each side of a frame 20. Coupled to, and projecting in a forward direction of travel from, the frame 20 is a tow-bar 22. The tow-bar 22 has a coupling eye 24 fixed to its forward end, which coupling eye 24 serves to couple to a towing vehicle, e.g. a farm tractor.

The press 12 is borne on the forward end of the frame 20. In the embodiment illustrated, the press is a cylindrical bale press, but it may have other forms, e.g., it may be a rectangular bale press or a high pressure bale press.

The wrapping apparatus 14 is fixed to the rear end of the frame 20. The wrapping apparatus has essentially two components, namely a wrapping arm 26 and a wrapping table 28. The wrapping apparatus 14 is of a type familiar on the market and functions to apply an air-impermeable wrapper to the bales formed in the press 12, so that the bale material can eventually be used as silage to feed animals.

In operation, the machine 10 is moved over a field by the tractor. Agricultural crop material lies on the field, and is picked up from the ground by a pickup device (not shown) and delivered to the press 12, to be pressed into a bale, shown in outline at 32. After a bale 32 has been formed, a rearward part 30 of the press 12 is swung rearwardly and upwardly, as illustrated in FIG. 1. After the bale 32 is released by the rearward part 30, the bale moves, as caused by the force of gravity, onto a carriage (also not shown) which receives the bale at a position approximately over the rear wheels 18 and brings it to the wrapping apparatus 14 in which it is wrapped with an air-impermeable film. One might consider any other type of conveying means to convey the bale between the press 12 and the wrapping apparatus 14, e.g., a gripping or hook device, a conveyor belt, or conveyor rolls; or gravity alone may be utilized for delivering the bale to the wrapping apparatus 14. A bale present in the wrapping apparatus 14 is designated 32'. As a rule, only one complete bale is present in the machine 10 at any given time.

The various driven elements of the machine 10 are controlled by an electronic control unit 40, via electro-hydraulic or electric motor means. The machine 10 and its functioning are disclosed in detail in Ger. 100 44 166 A1 and the references cited therein.

The machine 10 has an inventive apparatus for measurement of the weight force of the bale 32. The apparatus for measurement is comprised of a measurement device 34 and a data processing device 36. The measurement device 34 is comprised of a force measurement cell disposed between the tow-bar 22 and the coupling eye 24, which cell is set up to measure the vertical force which the tow-bar 22 exerts against the coupling eye 24, and via the coupling eye 24 against the tractor. The measurement device 34 is connected via a line or bus to a processing device 36 which also is connected to the control unit 40. The processing device 36 is further connected via a bus or wireless connection to a display and memory device 42 which may be disposed in the operator's cabin of the tractor. The display and memory device 42 is comprised of a display unit 46 on which the measured weight forces of the bale 32 can be displayed, and a memory device 44 in the form of a removable storage card. This card allows the weight force data, which have been developed, to be stored and to be processed further later, e.g. for accounting and billing purposes. The display and memory device 42 can be integrated into the bus system of the tractor. It would also be possible to dispose the processing device 36 on the tractor, in particular to integrate it into the display and memory device 42.

Figure 2:
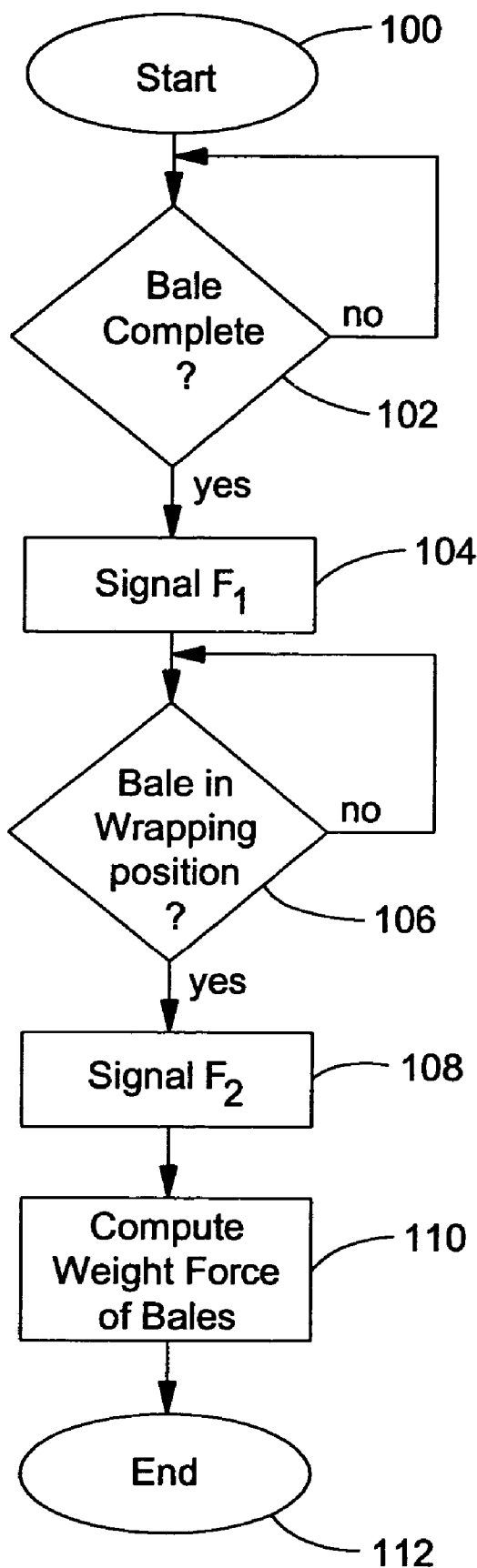
FIG. 2 is a flow diagram illustrating the operation of the apparatus of the devices of FIG. 1 for measurement of the weight force of a bale.

The operation of the apparatus for measurement of the weight force of the bale 32 will be described in the following, with reference to FIG. 2. As soon as the processing device 36 is informed by a signal from the control unit 40 that the press 12 has begun forming a bale 32, the routine begins at step 100. In the next step 102, the processing device 36 checks whether information which indicates completion of the formation of the bale 32 has been provided from the control unit 40. If such information is not at hand, step 102 is repeated. Otherwise the routine proceeds to step 104, wherein the output signal of the measurement device 34 is received and is delivered to a memory of the processing device 36.

Step 106 follows, in which the processing device 36 checks whether the bale 32' has arrived at the wrapping apparatus 14. This checking also occurs in response to a signal from the control unit, which can obtain information about the position of the bale 32 or 32' from separate sensors, e.g. photocell detection systems disposed at suitable locations. Alternatively or additionally, the position of the bale 32 or 32' can be deduced from positioning signals which are sent to active elements of the machine 10. Thus, it may be assumed that a bale 32' is in the wrapping apparatus 14 if the rearward part 30 of the press 12 has been swung upward and a certain time interval has passed thereafter. If the query in step 106 as to whether the bale 32 has reached to the wrapping apparatus 14 generates a negative answer, this step 106 is repeated. Otherwise the routine proceeds to step 108, wherein the output signal of the measurement device 34 is received and is stored in a memory of the processing device 36.

Step 108 is followed by step 110, in which the weight force and/or, in the event the gravity constant is known, the mass of the bale 32 or 32' is ascertained by the processing device 36 with the use of the output signals from steps 104 and 108. The change in position of the bale 32, 32' results in differences in the weight forces ascertained by the measurement device 34. The two output signals of the measurement device 34, which may be generated and transmitted over a relatively long time period in order to, e.g., minimize the error-causing influenc of unevenness in the terrain depend on the weight force of the bale 32, 32' and on known mechanical properties of the machine 10. By a suitable calculation process, the weight force of the bale 32, 32' can be calculated from the previously known and currently measured quantities. In this, calibration values obtained by comparative measurements can be utilized. The resulting ascertained weight force is displayed on the display device 46 of the display and memory device 42, and is stored in the removable memory device 44, for later use. Step 112 follows, in which the routine is ended. The processing device 36 is then ready to measure the weight force of the next bale.

Having described the preferred embodiment, it will become apparent that various modifications can be made without departing from the scope of the invention as defined in the accompanying claims.

The invention claimed is:

1. In a combination of a baler and bale wrapping apparatus for processing loads in the form of bales, wherein a given bale is movable between pre-selected first and second locations in the baler and bale wrapping apparatus, and an apparatus for measurement of the weight force of said given bale, and a measurement device connected to a data processing device provided for measuring a measurement parameter influenced by the weight force of said given bale, the improvement comprising: said measurement device being mounted at a fixed location in said baler and bale wrapping apparatus and disposed such that the signal which it develops depends on the weight force of said given bale both for when said given bale is disposed in said first location and when said given bale is disposed in said second location; and said processing device being set up to calculate the weight force of said given bale taking into account a first signal output from the measurement device when said given bale is in said first location and a second signal output from the measurement device when said given bale is in said second location.

2. The combination, as defined in claim 1, wherein said processing device is operable so as to calculate the weight force of said given bale taking into account known mechanical properties of the machine and taking into account the signals from the measurement device.

3. The combination, as defined in claim 1, wherein said baler includes a frame supported on wheels and a tow-bar carrying a coupling eye at its forward end; and said measurement device being disposed one of between said frame and said wheels, and between said tow-bar and coupling eye.

4. The combination, as defined in claim 1, wherein only a single measurement device is present.

5. The combination, as defined in claim 1, wherein said first location is in said baler and said second location is in said wrapping apparatus.

6. A method for measurement of the weight force of a bale processed by a combination of a baler and bale wrapping apparatus for positioning the bale at two different pre-selected locations comprising the following steps:

a) positioning said bale in the machine at a first pre-selected location, and measuring a first parameter which is influenced by the weight force of the bale;

b) moving said bale to a second pre-selected location in said combination of a baler and bale wrapping apparatus, and measuring a second parameter which is influenced by the weight force of the bale; and c) calculating the weight force of the bale, taking into account the first measured parameter and the second measured parameter.

* * * * *